US010655692B2

(12) United States Patent
Trybula

(10) Patent No.: US 10,655,692 B2
(45) Date of Patent: May 19, 2020

(54) NO-BACK DEVICE WITH ENERGY-DISPERSING SPRINGS

(71) Applicant: HAMILTON SUNSTRAND CORPORATION, Charlotte, NC (US)

(72) Inventor: Daniel Trybula, Wroclaw (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 473 days.

(21) Appl. No.: 15/480,856

(22) Filed: Apr. 6, 2017

(65) Prior Publication Data

US 2017/0299001 A1    Oct. 19, 2017

(30) Foreign Application Priority Data

Apr. 15, 2016 (EP) ................................ 16461513

(51) Int. Cl.
| | | |
|---|---|---|
| *F16D 59/02* | (2006.01) | |
| *F16D 43/02* | (2006.01) | |
| *B64C 5/00* | (2006.01) | |
| *F16D 121/14* | (2012.01) | |
| *F16D 125/32* | (2012.01) | |
| *F16D 125/58* | (2012.01) | |
| *F16D 127/00* | (2012.01) | |

(52) U.S. Cl.
CPC ............. *F16D 59/02* (2013.01); *B64C 5/00* (2013.01); *F16D 43/02* (2013.01); *F16D 2121/14* (2013.01); *F16D 2125/32* (2013.01); *F16D 2125/582* (2013.01); *F16D 2127/004* (2013.01)

(58) Field of Classification Search
None
See application file for complete search history.

(56) References Cited

U.S. PATENT DOCUMENTS

| 651,706 A | 6/1900 | Forbes |
| 3,417,843 A * | 12/1968 | Trollope ............. F16D 55/2255 188/170 |
| 3,802,281 A | 4/1974 | Clarke |

(Continued)

FOREIGN PATENT DOCUMENTS

| GB | 2265191 A | 9/1993 |
| WO | 2007095006 A2 | 8/2007 |

OTHER PUBLICATIONS

Extended European Search Report for International Application No. 16461513.0 dated Nov. 24, 2016, 10 pages.

*Primary Examiner* — Colby M Hansen
(74) *Attorney, Agent, or Firm* — Cantor Colburn LLP

(57) ABSTRACT

A no-back device for resisting feedback torque from an actuator. The no-back device comprises: a flange arranged to receive torque via a shaft; a ratchet assembly comprising a ratchet wheel arranged parallel to the flange; and a braking assembly comprising a resistance wheel, which is sandwiched between the flange and the ratchet wheel, and a braking device, which acts on the resistance wheel to generate a resistive angular force reacting against torque exerted on the resistance wheel. The braking device comprises a follower arranged to roll, under bias from a spring in the braking device, on a cam surface extending around a circumferential perimeter of the resistance wheel. Radial displacement of the follower energizes the spring to generate resistive angular force.

14 Claims, 7 Drawing Sheets

SECTION A-A

(56) References Cited

U.S. PATENT DOCUMENTS

| | | | |
|---|---|---|---|
| 4,176,733 A * | 12/1979 | Twickler | F16D 7/08 |
| | | | 188/134 |
| 4,762,205 A | 8/1988 | Ortman | |
| 5,655,636 A | 8/1997 | Lang et al. | |
| 6,109,415 A | 8/2000 | Morgan et al. | |
| 6,386,339 B1 * | 5/2002 | Woollams | F16D 59/02 |
| | | | 188/170 |
| 6,722,485 B1 | 4/2004 | Gitnes et al. | |
| 7,610,828 B2 | 11/2009 | Wingett et al. | |
| 9,527,580 B2 * | 12/2016 | Lang | F16D 59/02 |
| 2003/0010163 A1 | 1/2003 | Hu | |
| 2004/0040813 A1 | 3/2004 | Darby et al. | |
| 2006/0163026 A1 | 7/2006 | Lang | |

\* cited by examiner

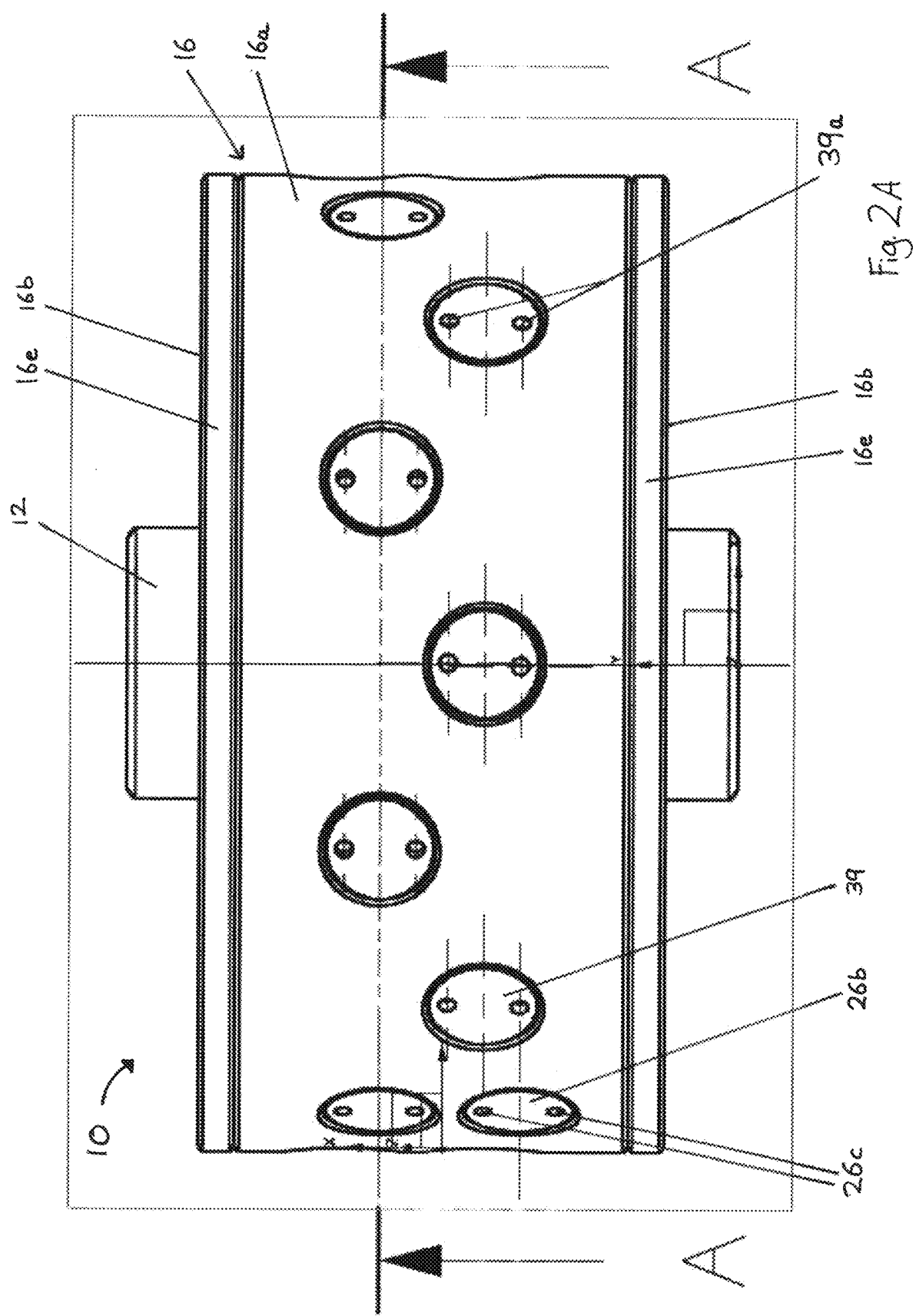

SECTION A-A

SECTION B-B

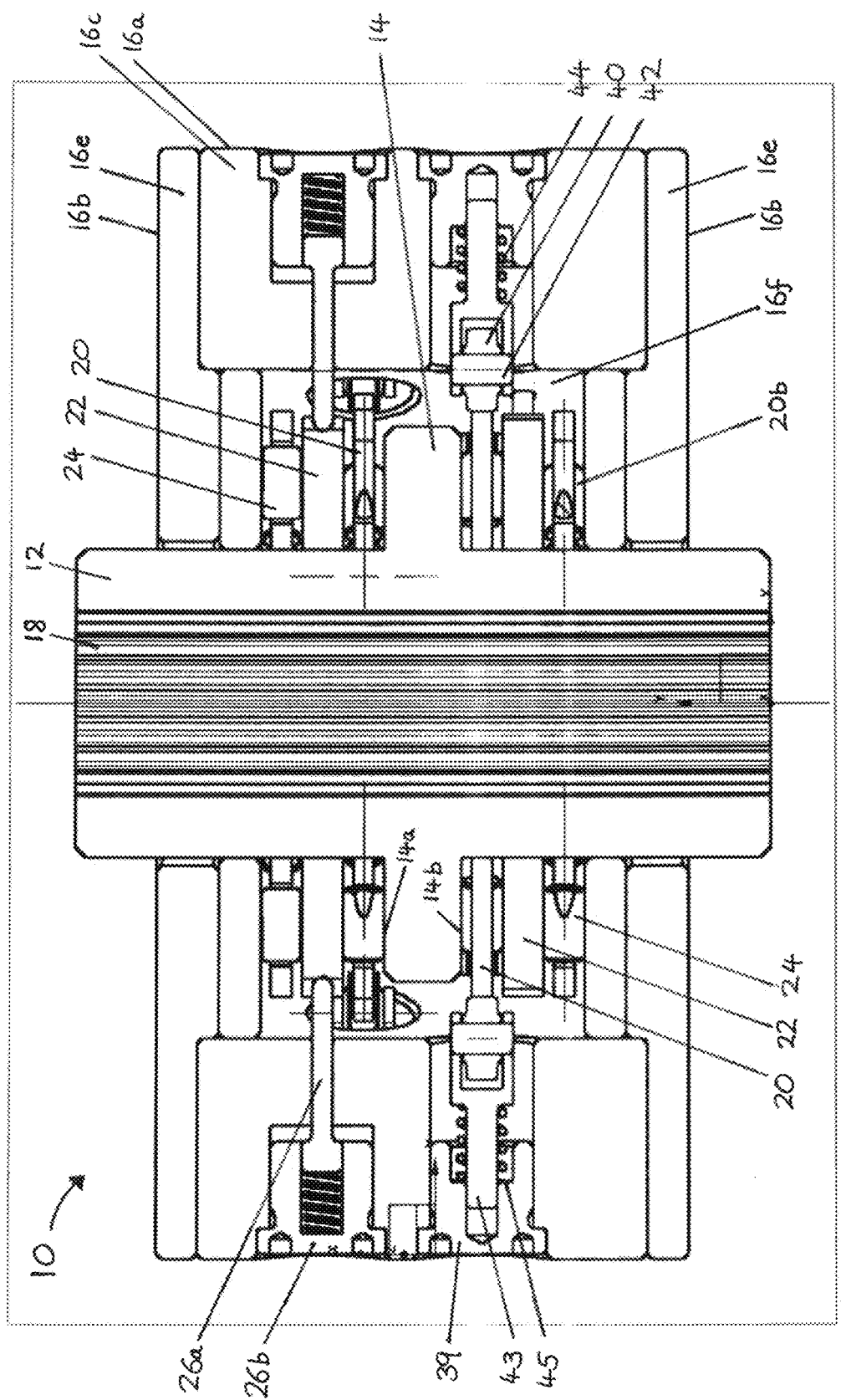

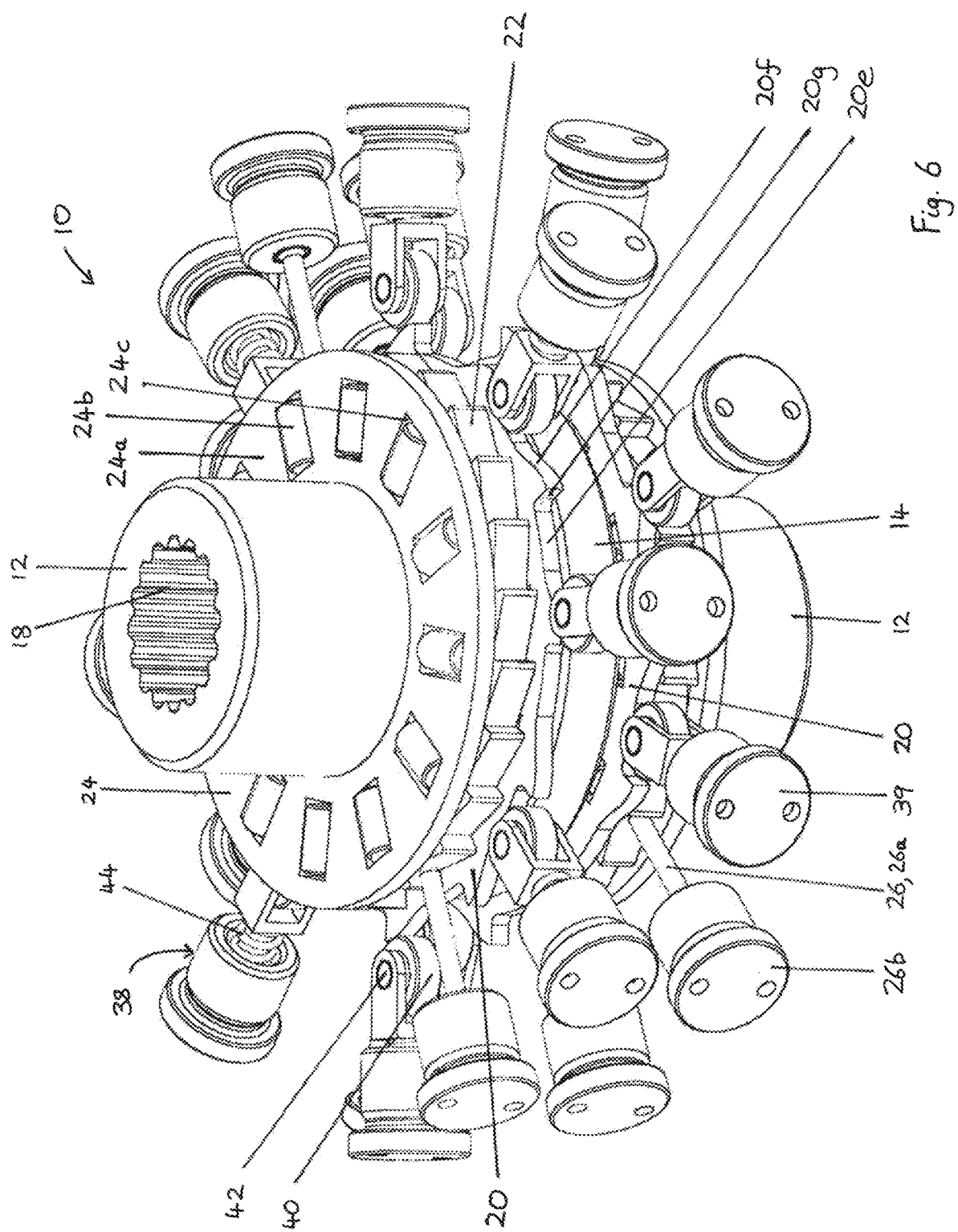

NO-BACK DEVICE WITH ENERGY-DISPERSING SPRINGS

FOREIGN PRIORITY

This application claims priority to European Patent Application No. 16461513.0 filed Apr. 15, 2016, the entire contents of which is incorporated herein by reference.

FIELD

The present disclosure relates to a no-back device, for example, for an actuator such as a trimmable horizontal stabiliser actuator (THSA). It also relates to a method of generating resistive angular force in a no back device.

BACKGROUND

Components such as flaps on aircraft are often driven for movement by ball-screw actuators. Forces on the component, e.g. from fast-moving air on the flap, may feed back through the nut of the ball-screw actuator and produce axial forces and torque on the screw shaft. These feedback forces tend to bias one direction of operation over the other. A no-back device is commonly used to provide resistive angular force to counteract this feedback torque and substantially balance the operational torque required by the motor to actuate the component.

It is desirable that the no-back device provide little resistance to torque originating from the driving motor, so that the torque is freely transmitted to the screw-shaft and can act to move the component in either direction, regardless of the direction of feedback torque.

U.S. Pat. No. 6,109,415 provides a prior-art no-back device in which a section of the ballscrew actuator shaft is received in a housing that allows very limited axial movement of the shaft. When the shaft is under compression, it experiences feedback torque in a first direction because the axial load exerted on the nut forces the balls of the nut in an axial direction against the inclined pitch of the screw thread on the shaft, urging the shaft to rotate and generating torque in the shaft. The load on the shaft also urges a flange of the shaft against a resistance wheel which in turn is pressed against a ratchet wheel. However, the ratchet wheel is orientated so that rotation is blocked in the direction of the feedback torque (the "feedback" direction). As a result, the resistance wheel generates a resistive force via friction with the flange and the ratchet wheel which acts counter to the feedback torque being transmitted by the shaft via the flange. In this way, the tendency of the nut to want to move along the screw thread is counteracted by this resistive angular force. The motor can then drive the shaft in different directions using substantially equal amounts of force.

In U.S. Pat. No. 6,109,415, the resistance wheel comprises a series of rollers that are arranged in the plane of the resistance wheel but inclined to the radial direction. In the feedback direction, when the rollers are providing a resistive angular force, the relative angular movement causes the rollers to slide against the surfaces of the flange and ratchet wheel to generate the angular resistive force.

The no-back device of U.S. Pat. No. 6,109,415 includes a second ratchet assembly and a second braking device arranged on the opposite side of the flange, so that when the shaft is under tension and experiencing feedback torque in an opposite rotational direction, the flange engages with a second resistance wheel which is in turn urged against a second ratchet wheel. The second ratchet wheel is arranged to block rotation in that opposite direction, causing the resistance wheel to generate a resistive angular force reacting to the feedback torque.

Such conventional no-back devices have generally been considered satisfactory for their intended purpose. However, it has been recognized that the braking forces generated through surfaces rubbing against one another can cause debris to accumulate within the no-back device. Such foreign objects can cause damage to the internal working of the no-back device and may compromise its reliability. There is a need to provide a no-back device which runs a lower risk of generating foreign objects (e.g. scobs) within the mechanism.

SUMMARY

According to a first aspect, the disclosure provides a no-back device comprising: a flange arranged to receive torque via a shaft; a ratchet assembly comprising a ratchet wheel arranged parallel to the flange; and a braking assembly comprising a resistance wheel, which is sandwiched between the flange and the ratchet wheel, and a braking device, which acts on the resistance wheel to generate a resistive angular force reacting against torque exerted on the resistance wheel, characterised in that the braking device comprises a follower arranged to roll, under bias from a spring in the braking device, on a cam surface extending around a circumferential perimeter of the resistance wheel, and whereby radial displacement of the follower energizes the spring to generate resistive angular force.

In accordance with the aspect described above, the generation of resistive angular force may be in reaction to torque exerted on the resistance wheel from the flange when the flange is urged towards the resistance wheel under axial load and torque is received from the shaft.

In accordance with the any of the aspects described above, the follower may be coupled to an end of the spring, such that radially outward displacement of the follower causes corresponding compression in the spring, energising the spring.

In accordance with any of the aspects described above, the cam surface may define a plurality of cams to repeatedly energise and release the energy of the spring as the resistance wheel is rotated under the follower, whereby work is expended in the spring to generate resistive angular force on the resistance wheel, preferably wherein the cams of the cam surface may have an asymmetrical duty cycle to achieve this.

In accordance with any of the aspects described above, the cam surface of the resistance wheel may comprise a plurality of sawtooth cams which are sized to allow the follower to roll over the cams in both directions without blocking rotation.

In accordance with either of the two aspects described immediately above, the cams may have a convexly curved ramp-section where the incline is progressively reduced as the follower reaches an apex of the cam. The cam surface may comprise arcuate portions of substantially constant radius between the cams.

In accordance with any of the aspects described above, the no-back device may comprise a plurality of braking devices arranged spaced about the circumferential perimeter of the resistance wheel, each having a spring-biased follower deployed to roll on different portions of the cam surface of the resistance wheel.

In accordance with any of the aspects described above, the resistance wheel may further comprise a plurality of rollable thrust members to transfer axial load from the flange to the ratchet wheel.

In accordance with any of the aspects described above, the no-back device may comprise a second ratchet assembly and a second braking assembly positioned on an opposite side of the flange, for providing resistive angular force in reaction to torque in an opposite direction when under an axial load which urges the flange towards the second braking assembly and second ratchet assembly.

In accordance with any of the aspects described above, the device may include a housing and the housing may comprise a row of holes arranged circumferentially around the housing, each hole corresponding to an associated braking device, wherein a cap is provided as part of a braking device to close off each hole and retain the braking device within the housing with the follower in biased contact with the cam surface of the resistance wheel.

In accordance with any of the aspects described above, the no-back device may be for an actuator of a stabilizer. The no-back device may be for a trimmable horizontal stabilizer actuator (THSA).

In another aspect, the present disclosure provides a method of generating a resistive angular force in a no-back device, the method comprising: receiving torque on a flange via a shaft; engaging a ratchet assembly, the ratchet assembly comprising a ratchet wheel arranged parallel to the flange; and engaging a braking assembly, the braking assembly comprising a resistance wheel, which is sandwiched between the flange and the ratchet wheel, and a braking device, which acts on the resistance wheel generating a resistive angular force reacting against torque exerted on the resistance wheel, characterised by generating the resistive angular force by rolling a follower, under bias from a spring in the braking device, on a cam surface extending around a circumferential perimeter of the resistance wheel, wherein radial displacement of the follower energises the spring to generate the resistive angular force.

In accordance with the aspect described above, the method may include repeatedly energising and releasing energy in the spring to expend work as the follower rolls over the cam surface.

In accordance with the aspects described above, the method may include engaging the ratchet assembly and the braking assembly by applying an axial load to the shaft. It may include generating resistive angular force on the resistance wheel when torque is received via the shaft in an angular direction that is blocked by the ratchet assembly. It may include releasing energy input into the spring as heat into the no-back device.

In another aspect, the present disclosure provides a trimmable horizontal stabilizer actuator including a no-back device, comprising the no-back device in accordance with any of the aspects described above.

DESCRIPTION OF THE FIGURES

Certain embodiments of the present disclosure will now be described in greater detail by way of example only and with reference to the accompanying drawings in which:

FIG. 2A shows a side elevation of an exemplary embodiment of a no-back device according to the present disclosure and FIG. 2B shows a further side elevation through 90°;

FIG. 5 shows a section along line C-C of FIG. 2B and

FIG. 6 shows a perspective view of the exemplary no-back device with the housing omitted.

DETAILED DESCRIPTION

Figure 1:
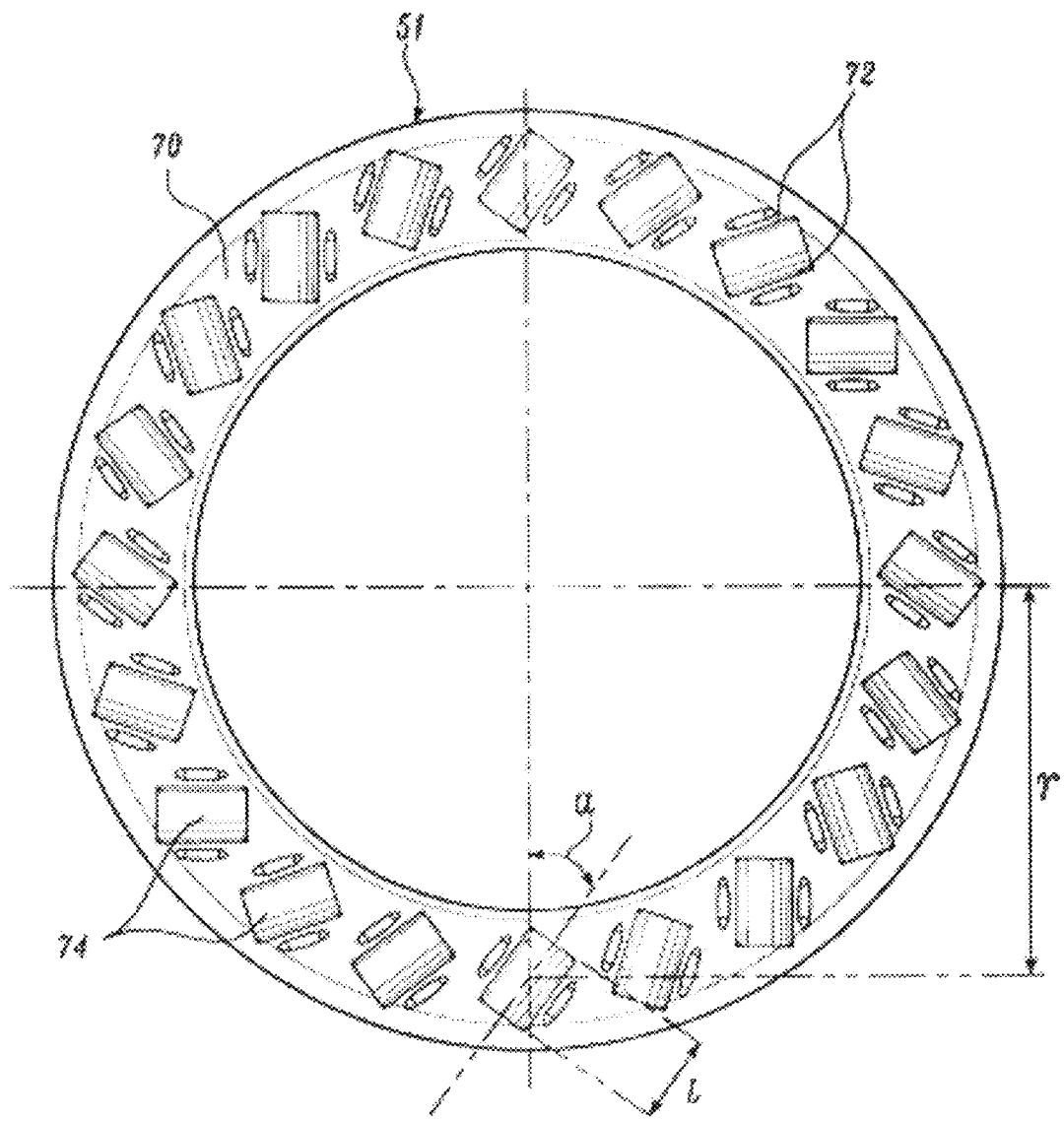
FIG. 1 shows a plan view of a resistance wheel shown in U.S. Pat. No. 6,109,415.

FIG. 1 illustrates a resistance wheel 51 from a no-back device illustrated in U.S. Pat. No. 6,109,415.

In the device, the resistance wheel 51 is sandwiched between a flange on one side of the resistance wheel and a ratchet wheel on the other. Axial load and torque is transmitted to the flange by a shaft from an actuator, for example, a screw actuator. The resistance wheel 51 comprises a plurality of thrust members 74 for transmitting axial load from the flange to the ratchet wheel. These are in the form of a cylindrical rollers which are arranged with their axes at an angle α to the radial direction. In this way, they can roll while also providing a braking force reacting to torque exerted on the resistance wheel by the flange.

While the arrangement in U.S. Pat. No. 6,109,415 is well used in the aircraft industry, there is a desire to improve aspects of the operation of a no-back device. It has been identified that reliability of the no-back device may be improved if it is possible to reduce the production of foreign objects (e.g. debris from wear, sometimes referred to as scobs) within the no-back device.

Figure 2B:
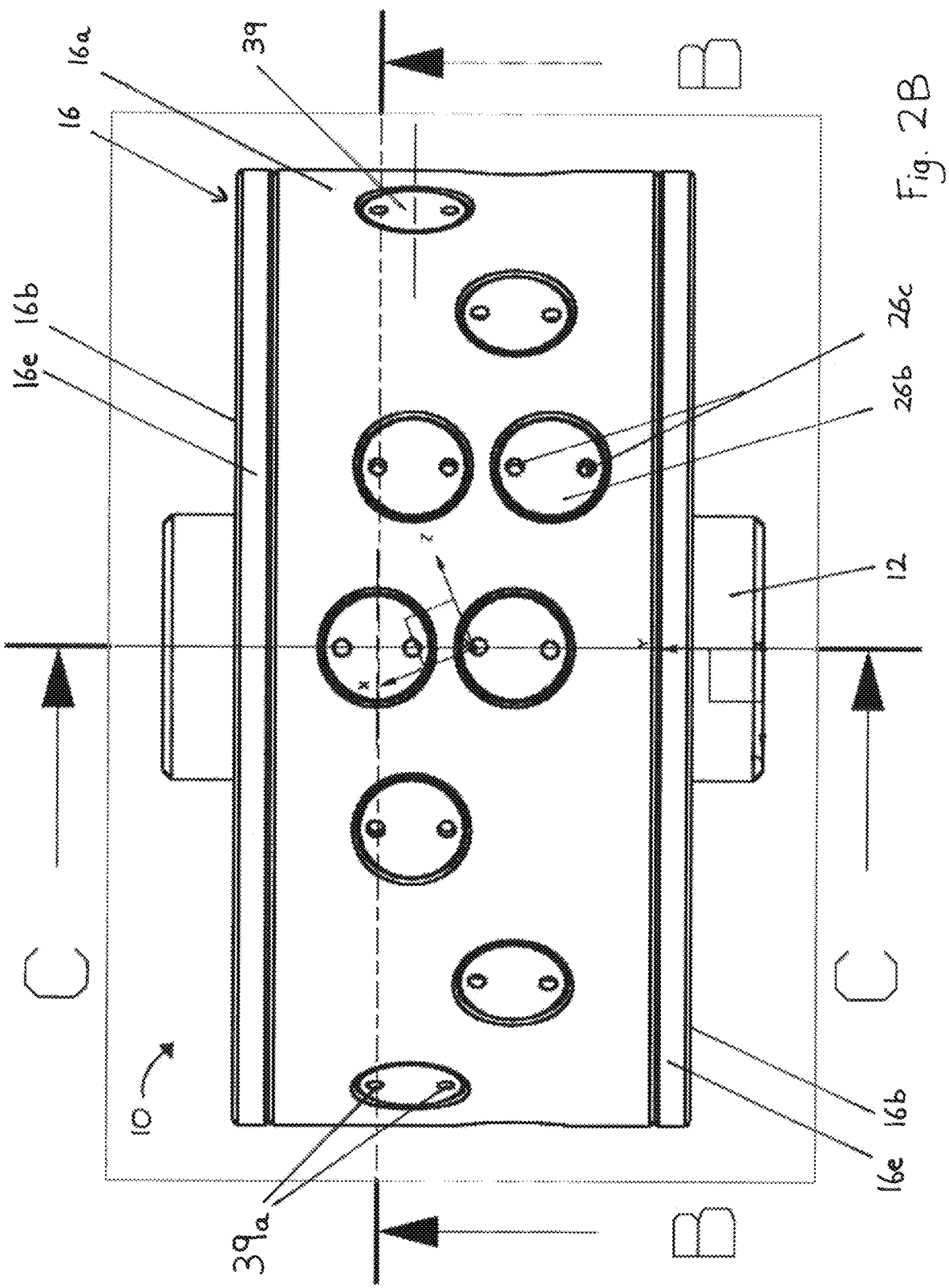
Figure 3:
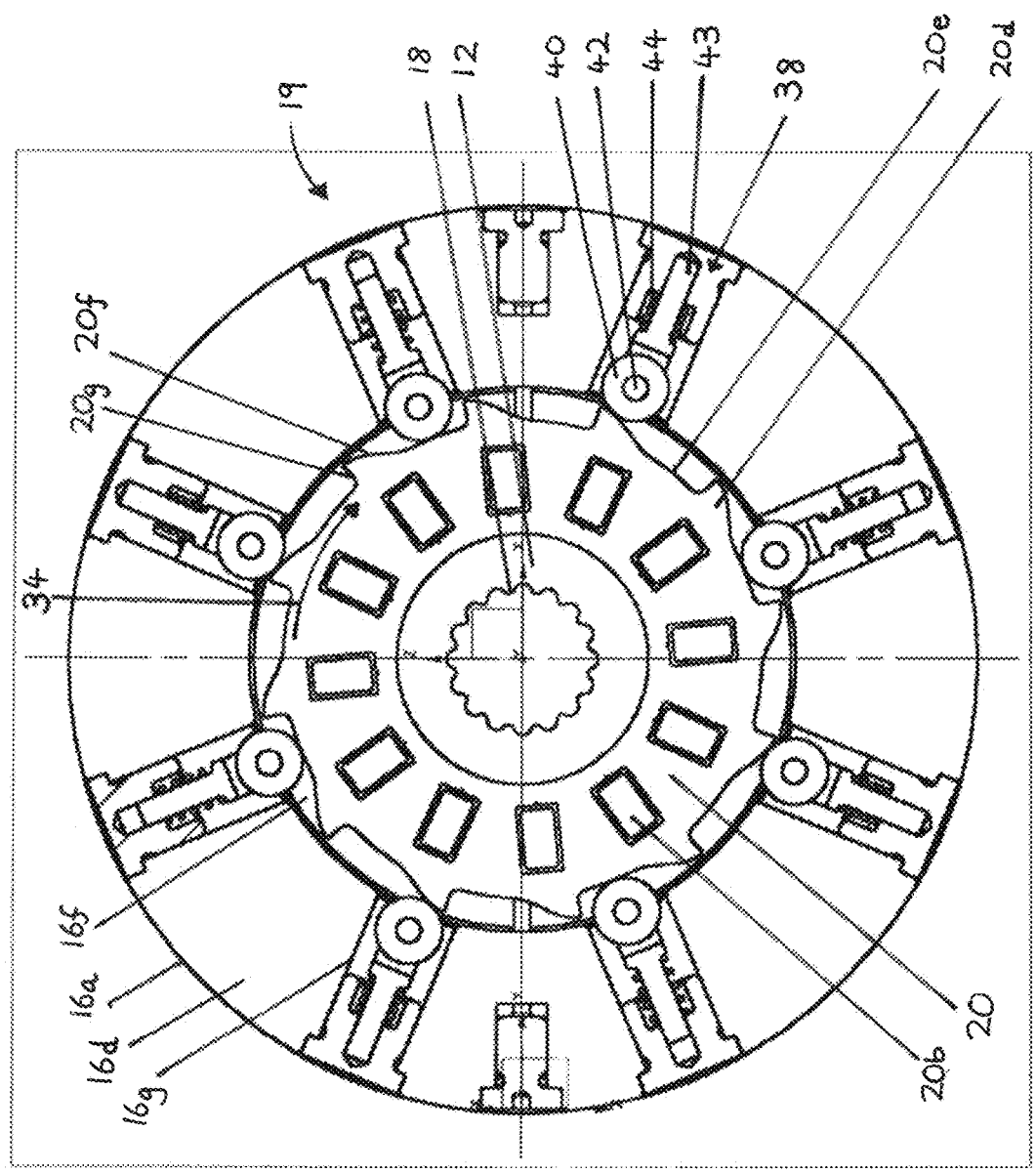
FIG. 3 shows a section along line A-A of FIG. 2A.
Figure 4:
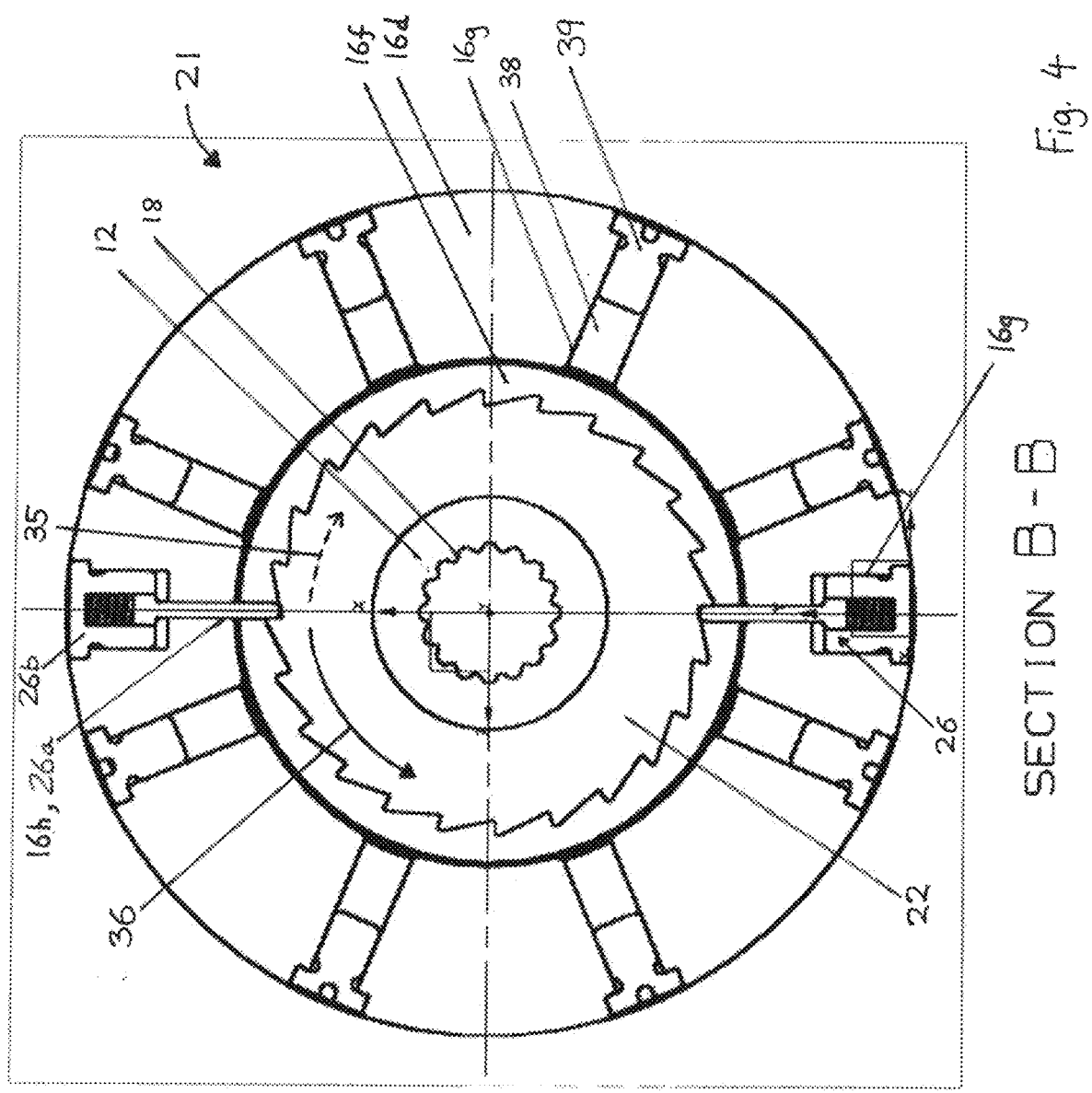
FIG. 4 shows a section along line B-B of FIG. 2B.

FIG. 2A illustrates a side view of an exemplary embodiment of a no-back device 10 according to the present disclosure. FIG. 2B illustrates a side view of the same no-back device 10 turned through 90°. Lines A-A, B-B and C-C indicate where sections are taken through the no-back device 10 to generate the elevations shown in FIGS. 3 to 5. FIG. 3 is a cross-section perpendicular to the central axis (line C-C) taken at a level of a resistance wheel, while FIG. 4 is a cross-section perpendicular to the central axis taken at a level of a ratchet wheel. FIG. 5 is a cross-section along the central axis through the no-back device 10 aligned through one of the pawls (26 in FIG. 4).

As can be seen from FIG. 2A, the no-back device 10 may comprise a generally cylindrical housing 16, having a circumferential outer surface 16a and two end faces 16b (upper and lower end faces in the figure). The housing 16 may comprise a ring-shaped body member 16c (see FIGS. 3 and 4), defining a cylindrical wall 16d of the housing 16, and two end plates 16e (see FIG. 5), which close off the ring-shaped body member 16c to form an internal cavity 16f for the no-back mechanism.

A shaft 12 may pass through the housing 16 and project from each end face 16b of the housing 16. Within the housing 16, the shaft 12 has a radially extending flange 14 (see FIG. 5).

The shaft 12 may be hollow and further comprise splines 18 on an internal surface as shown in FIGS. 2 and 3, for connecting the shaft 12 to other shafts. For example, the shaft 12 of the no-back device 10 may be splined to a screw shaft (not shown) at one end and to a drive-shaft from a motor (not shown) at the other. In an alternative arrangement, splines may be provided on an external surface of the shaft 12 to transmit drive. The no-back device 10 may sit in the mechanical path between a screw shaft and a motor.

The housing 16 may enclose a pair of braking assemblies 19 (which can be seen in more detail in FIG. 3) and a pair of ratchet assemblies 21 (which can be seen in more detail in FIG. 4). One of the braking assemblies 19 and one of the ratchet assemblies 21 may be provided on one side 14a of the flange 14, and the other of the braking assemblies 19 and the other of the ratchet assemblies 21 may be provided on the other side 14b of the flange 14, as shown.

Each braking assembly 19 comprises a resistance wheel 20 which is coaxial with the shaft 12. The shaft 12 may pass through a central aperture in each of the resistance wheels 20, the resistance wheels 20 being dimensioned to rotate freely about the shaft 12. Each braking assembly 19 may include a number of braking devices 38 which are arranged radially around the resistance wheel 20 to act on a circumferential surface 20a of the resistance wheel 20. In the arrangement of FIG. 3, eight braking devices 38 are illustrated, arranged spaced around the resistance wheel 20. However there may be a different number of braking devices depending on the configuration of the no-back device 10. The number may be three or more. It may be 12 or less. It may be an even number, for example, four, six, eight, ten or twelve.

Each ratchet assembly 21 comprises a ratchet wheel 22 which is coaxial with the shaft 12. The shaft 12 also passes through a central aperture in each of the ratchet wheels 22, the ratchet wheels 22 being dimensioned to rotate freely about the shaft 12 as well. Each ratchet assembly 21 includes one or more pawls 26 arranged to act on the ratchet wheel 22 so that it may only rotate in one direction. In the arrangement of FIG. 4, two pawls 26 are shown, arranged opposite each other about the ratchet wheel 22.

The shaft 12 may be mounted within the housing 16 with a very limited amount of axial movement allowed. In this way, axial load in one direction may displace the flange 14 in an axial direction towards a resistance wheel 20 and ratchet wheel 22 on one side 14a of the flange 14, while axial load in the other direction may displace the flange 14 in an axial direction towards the other resistance wheel 20 and ratchet wheel 22 on the other side 14b of the flange 14. When the flange 14 is urged towards one set of the resistance and ratchet wheels 20, 22 under axial load in one direction, it is pulled away from the other set and so is not able to transmit torque to the resistance and ratchet wheels 20, 22 of the other set. However, the thickness dimensions of the wheels and flange are such that the movement, if any, is kept to a minimum. The flange 14 may remain in contact with the braking assembly 19 on the opposing side (i.e. on the side opposite the direction of axial load), but with only light contact forces, leading to limited friction between the flange 14 and the aforementioned braking assembly 19.

A pair of thrust bearings 24 may be provided (see FIGS. 5 and 6), each one to support a ratchet wheel 22 on its side opposite the associated resistance wheel 20. The thrust bearing 24 in each case may bear against the housing 16, e.g., on an inside surface of end plate 16e), allowing the ratchet wheel 22 to rotate relative to the housing 16 while transferring axial load on the ratchet wheel 22 to an end plate 16e of the housing 16. The shaft 12 may also extend through the thrust bearings 24 in a similar way to the resistance wheels 20 and the ratchet wheels 22.

The flange 14, resistance wheels 20, ratchet wheels 22, and thrust bearings 24, may be all stacked coaxially. The shaft 12 may extend from the flange 14 through a resistance wheel 20, ratchet wheel 22, and thrust bearing 24, in turn on each side of the flange 14. The shaft 12 may extend beyond the thrust bearing 24 and through the housing 16 as shown in FIG. 5, or the shaft 12 may end at a location flush with the housing 16 surface or at a location just below the surface of the housing 16 as desired.

In operation, the shaft 12 receives axial load from another component. In one example, this may be a nut on a screw shaft of an actuator, e.g. to operate a flap of an aircraft. When the flap is deployed, the pressure of air against the flap will exert a force on the nut in an axial direction of the screw shaft. Under the axial load, the nut will be urged towards the circumferentially inclined surface of a screw thread, which in turn will generate an angular force or torque in the screw shaft which is then transmitted to the shaft 12 of the no-back device 10.

By way of example, the axial load may be pulling upwards in the arrangement shown in FIG. 2A (i.e. in the direction of the arrows for the line A-A, such that the shaft 12 is in tension), and, in the case of a left-handed screw thread, through the nature of the screw thread, an anticlockwise angular force or torque may be exerted on the shaft 12 (anticlockwise when viewing the no-back device 10 from above the shaft 12 in FIG. 2A).

Alternatively, if the screw has a right-handed screw thread, then the torque will be clockwise in the situation just described. The following disclosure will assume a left-handed screw thread. If the no-back device 10 is used with a right-handed screw thread, then the directionality of each ratchet wheel 22 and resistance wheel 20 must be reversed from those shown in the figures.

The cross-section of FIG. 3 is at the level of a resistance wheel 20 and is viewing upwards along the axis towards the top end of the shaft 12 in FIG. 2A. The anticlockwise torque described above is being viewed from the opposite direction now and so appears as a clockwise torque in the direction of arrow 34 in FIG. 3.

Under such axial loading (tension), the flange 14 of the shaft 12 is pulled upwards towards the resistance wheel 20. The side 14a of the flange 14 adjacent the resistance wheel 20 is urged against thrust members 20b seated in recesses 20c in the resistance wheel 20. This tension in turn pulls the resistance wheel 20 towards the ratchet wheel 22, the ratchet wheel 22 towards the thrust bearing 24 and the thrust bearing 24 towards the underside of the top end plate 16e. The thrust members 20b in the resistance wheel 20 transmit the axial load from the flange 14 to the ratchet wheel 22 directly, and the ratchet wheel 22 then transmits the axial load to the end plate 16e through the thrust bearing 24.

The axial load causes the flange 14 to engage the resistance wheel 20 via frictional contact with the thrust members 20b. In this way, torque exerted on the flange 14 by the shaft 12 may be transmitted via the thrust members 20b to urge the resistance wheel 20 to rotate in the direction of arrow 34 in FIG. 3 (a clockwise direction when viewed from inside the no-back device 10). This torque exerted on the resistance wheel 20 will also act on the ratchet wheel 22 through the frictional engagement of the thrust members 20b. However, in this direction, rotation of the ratchet wheel 22 is blocked by the pawls 26 and so this torque will cause the thrust members 20b to roll over the surface of the ratchet wheel 22, in so doing, rotating resistance wheel 20 about the shaft 12 in the direction of arrow 34.

In the illustrated embodiment, the thrust members 20b are cylindrical rollers which are aligned with their axes extending in a radial direction of the resistance wheel 20. The thrust members 20b are seated in rectangular recesses 20c which extend through the resistance wheel 20. The diameter of the thrust member 20b may be chosen to allow a portion to project from one side of the resistance wheel 20 and an opposite portion to project from the other side of the resistance wheel 20. In this way, the thrust members 20b transmit the axial load directly from the flange 14 to the ratchet wheel 22.

The thrust members 20b may take other forms, for example, they may be ovaloid or spherical. They may comprise ball bearings instead of rollers, or there may be a mixture of types of thrust member 20b. The recesses 20c may be other shapes such as circular or cup-shaped.

The thrust members 20b may be of a configuration that is best able to transmit the axial load while minimizing the creation of foreign objects (debris) within the no-back device 10. A cylindrical roller provides a line of contact for transmitting load. The A radial alignment of the rollers will minimize wear from rotation of the resistance wheel.

As can be seen in FIG. 3, the resistance wheel 20 has a circumferential perimeter 20a which is profiled to provide a cam surface. The cam surface 20a may resemble that of a ratchet wheel, having cams 20d allowing rotation in one direction (for example in the direction of arrow 34 in FIG. 3, albeit under a resistance which will be described in greater detail below). The resistance wheel may be configured to allow it to rotate also in the opposite direction (i.e. opposite to the direction of arrow 34 in FIG. 3), which will be described in greater detail below.

The resistance wheel 20 has a circumferential perimeter 20a of varying radius. In the illustrated example of FIG. 3, the resistance wheel 20 comprises a plurality of cams 20d, each cam 20d separated from the next by a land 20e of constant radius (i.e. the perimeter follows an arc of a circle at these points). As shown in FIG. 3 the resistance wheel 20 may have twelve cams 20d disposed at regular intervals around the resistance wheel 20 alternately spaced with twelve lands 20e.

The number of cams 20d may be different to that shown depending on the configuration of the no-back device 10. There may be more than two cams 20d, for example four or more. There may be fewer than twenty cams 20d, for example sixteen or fewer. There may be an even number of cams 20d. For example, there may be six, eight, ten, twelve or fourteen cams. There may be more cams 20d than braking devices 38.

The cams 20d may be configured to work with multiple braking devices 38 which act on the circumferential perimeter 20a of the resistance wheel 20. The braking devices 38 may be evenly spaced around the resistance wheel 20.

Each braking device 38 may comprise a follower 40 in the form of a roller 40 mounted on a roller axle 42. The roller 40 may rotate freely about the roller axle 42 in either direction. The roller axle 42 may be connected in turn to a post 43 which supports the roller 40 for movement along a radial direction of the resistance wheel 20.

A spring 44 may be disposed in each braking device 38 for compression when the follower 40 is displaced radially outward by a cam 20d. The spring 44 may be a coil spring. It may be a metal coil spring. It may be disposed over the post 43 between the roller 40 and a thrust surface 45 within the housing 16. The spring 44 may bias the follower 40 against the circumferential perimeter 20a of the resistance wheel 20.

The follower 40 of the braking device 38 may take other forms from that shown. For example, it may be ovaloid or spherical, rather than cylindrical. It may comprise a ball retained within a cup mounted to a post 43. By providing a follower 40 that rolls over the cam surface of the resistance wheel 20, the creation of foreign objects within the no-back device 10 resulting from wear is reduced.

The braking device 38 may include a cap 39 which provides a thrust surface 45 for the spring 44. The cap 39 may also support the post 43, allowing it to reciprocate in a radial direction of the resistance wheel 20.

The cap 39 may be provided with a screw thread or other fixing arrangement to locate it in place within a radially extending hole 16g provided through the cylindrical wall 16d of the housing 16. The cap 39 may be removable, for example, by unscrewing, to allow removal of individual braking devices 38 for maintenance purposes. The provision of a screw thread may also allow a degree of adjustment to the spring force provided by the braking device 38 on the cam surface 20a. The cap 39 may include one or more holes 39a or other type of formation for a tool to engage into for adjustment and removal/fitting.

The cams 20d may each have the same asymmetrical shape as shown in FIG. 3. Each cam 20d may have a ramp 20f of relatively low gradient rising to the apex of the cam 20d, followed by a step 20g of relatively high (negative) gradient where the radial displacement of the cam 20d drops back to the constant or substantially constant radius of the land 20e.

The follower 40 (roller) of each braking device 38 may be pushed in a radial direction against the cam surface 20a of resistance wheel 20 by the force of the spring 44. Rotation of the resistance wheel 20 in the direction of arrow 34 of FIG. 3, effectively causes each follower 40 to roll over the cam surface 20a in the opposite direction, rolling up a ramp 20f of a given cam 20d before rolling over the step 20g and dropping back to land on the radially lower surface of a land 20e.

In so doing, the spring 44 of the braking device 38 is energised through the radially outward displacement of the follower 40 as it rolls up ramp 20f and through the corresponding compression of the spring 44. As the follower 40 reaches the apex and rolls over the step 20g, the energy stored in the spring 44 is released as heat.

Even when there is no rotation of the resistance wheel 20, the spring force of some of the braking devices 38 (e.g., half of the braking devices 38) will be acting on the ramps 20f of underlying cams 20d, providing an angular force on the resistance wheel 20.

This process of energizing the spring 44 and releasing the energy may occur a plurality of times during a full rotation of the resistance wheel 20 in the direction 34, the number of cycles corresponding to the number of cams 20d.

The braking devices 38 may be arranged so that oppositely positioned springs 44 are energized simultaneously, to balance the force on the resistance wheel 20. In the arrangement of FIG. 3, four of the eight braking devices 38 are arranged so that the followers 40 are rolling up ramps 20f of the cams 20d simultaneously and at radial intervals of 90° to each other. At that time the other four braking devices 38 are positioned so that the followers 40 are rolling along the lands 20e. At the point where the energy is released from the first set of energized braking devices 38, the second set may move into position to be energized by other ramps 20f of other cams 20.

The cams 20d and braking devices 38 may be arranged to provide a uniform resistive force on the resistance wheel 20 when it is stationary within the housing 16.

As well as allowing rotation in the direction of arrow 34, the cams 20d and followers 40 may be sized such that the followers 40 can roll over the cams 20d when the resistance wheel 20 rotates in the other direction (i.e. in the direction opposite arrow 34 in FIG. 3). When this occurs, the spring 44 of a follower 40 must be compressed as the follower 40 moves over the step 20g of the cam 20d. This compression of the spring 44, while it removes energy from the resistance wheel 20, this spring energy is then recovered as the follower 40 rolls down the ramp 20f. In this way there is little or no net energy dissipation when the resistance wheel 20 rotates in this direction.

In the arrangement of FIG. 3, the eight illustrated braking devices 38 are spaced at 45° to each other, evenly around the no-back device 10. The two rows of braking devices 38 arranged around their respective resistance wheels 20 can be seen in the perspective view of FIG. 6 (the housing 16 has been omitted to allow the internal detail to be seen).

Other arrangements are envisaged where the braking devices 38 are spaced at other angular intervals around the resistance wheel 20, for example, two at 180°, three at 120°, four at 90°, six at 60° or twelve at 30°. The braking devices 38 could also be arranged at other intervals.

The springs 44 of each of the braking devices 38 may be identical to generate correspondingly similar amounts of spring force. In other arrangements, the springs 44 might be different and the spacing of the braking devices 38 or cams 20d might be adjusted to balance the radial forces around the shaft 12, to avoid wear.

The cams 20d of the cam surface 20a may have a convexly curved ramp 20f where the incline is progressively reduced as the follower reaches an apex of the cam 20d (a more shark-fin like shape). In this way, the convexly curved ramp 20f compensates for motion of the follower 40 on the cam 20d to provide a substantially constant rate of energisation in the spring 44 of the braking device 38 when the resistance wheel is rotating with constant speed. The convexly curved ramp 20f may follow a substantially sinusoidal profile.

The caps 39 locating the followers 40 within the housing 16 may be made of metal. They may be made of a metal with good thermal conduction properties. The housing 16 may be made of metal too and this may help to conduct heat from the springs 44 and transmit heat to the surroundings. The metal might be a robust steel, e.g., offering benefits from the cyclic loadings, or it may be possible to use a material like aluminium, offering higher heat conduction properties and lighter weight.

FIG. 4 is a section at the level of the ratchet wheel 22 along line B-B, i.e., looking from within the no-back device 10 up towards the top of the housing 16 in FIG. 2B. The sawtooth profile of the ratchet wheel 22 can be seen clearly in the figure. The teeth 22a of the ratchet wheel 22 are arranged in an opposite rotational direction to the cams 20d of the underlying resistance wheel 20.

In the example shown, two pawls 26 are arranged opposite each other about the ratchet wheel 22 to engage the teeth 22a of the ratchet wheel 22, the pawls 26 being positioned to balance the angular forces resulting from the blocking operation. Through the interaction of the pawls 26 with the teeth 22a, the ratchet wheel 22 is free to rotate in one direction 36 (the "forward" direction of the ratchet device) but is prevented from rotation in the opposite direction 35 (the "backward" direction of the ratchet device). The arrow 34 in FIG. 3 points in the same direction of rotation as the arrow 35 in FIG. 4.

The pawl 26 may comprise a blocking member 26a which is guided to reciprocate in a radial direction of the ratchet wheel 22 into and out of a cap 26b at its retained end against the bias of a spring 22c. The blocking member 26a may comprise a cylindrical pin which is guided within a narrow passageway 16h in the cylindrical wall 16d of housing 16. The cap 26b may comprise a similar structure to the cap 39 of a braking device 38, and similarly, may be provided with a screw thread which is received within a threaded radially extending hole 16g located within the cylindrical wall 16d of the housing 16. A screw thread, or similar mechanism, may allow the pawl 26 to be extracted for maintenance purposes. Holes 26c may be provided in the cap 26b to allow it to be removed and fitted.

The upper surfaces of the radially extending holes 16g for the eight braking devices 38 can also be seen in FIG. 4. The pawls 26 may be positioned midway between two braking devices 38 as shown.

As mentioned above, when torque is applied to the resistance wheel 20 in the direction of arrow 34 in FIG. 3, the frictional contact of the thrust members 20b also applies torque to the ratchet wheel 22 in the direction of arrow 35 in FIG. 4. However, the ratchet wheel 22 is blocked in this direction 35. This forces the resistance wheel 20 to rotate in the direction of arrow 34 under the influence of the torque in the flange 14.

That is to say, the resistance wheel 20 and the ratchet wheel 22 are arranged so that when resistive angular force is generated by one of the braking assemblies 38, the torque also engages the corresponding ratchet assembly 21 to block rotation of the respective ratchet wheel 22.

The effect of rotating the resistance wheel 20 in the direction of arrow 34 is that the springs 44 of the braking devices 38 are repeatedly energized and the energy released as heat to the surroundings. This work performed by the springs 44 of the braking devices 38 creates an angular resistance—an angular resistive force—which is reacting to the torque on the shaft 12. This counter force may substantially balance the torque on the shaft 12 in this load direction.

In the example of a nut on a screw shaft, the axial load from deployment of a component such as a flap, generates a feedback torque on the screw shaft. The angular resistive force created by the braking assembly 19 can be set to substantially counter the feedback torque experienced during normal operation of the component. In this way, when the screw shaft is operated, for example, by a motor, the forces on the motor may be approximately the same regardless of which way the shaft 12 is turning.

Also when the actuator and no-back device 10 is static, the springs 44 of the braking devices 38 engaging ramps 20f of the cams 20d will create a torque which may counter substantially the feedback torque from that actuator position. This may reduce the tendency of a nut to move axially along a screw shaft.

The interaction of cams 20d and the braking devices 38 when the resistance wheel 20 rotates in one direction causes the springs 44 to absorb rotational energy from the resistance wheel 20. Due to the shape of the cams 20d, this spring energy is not returned to the resistance wheel 20 as rotational energy when the followers 40 spring back to the land 20e after passing the apex of each cam 20d. This is because the impulse from the follower 40 springing back onto the land 20e is purely radially directed and has no circumferential component.

Stated another way, the cams 20d of the cam surface 20a may be said to have an asymmetrical duty cycle to cause work to be expended in the spring 44 as the resistance wheel 20 is rotated in a blocked direction of the ratchet wheel 22 (a work direction).

Rotation in the opposite direction may, however, result in the energy stored in the spring 44 being recovered by the resistance wheel 20, as the follower 40 rolls down the progressive incline 20f. Substantially no energy may be lost from this movement (a non-work direction).

The cam surface may comprise a plurality of asymmetrical cams 20d configured to energise the spring 44 of the braking device 38 through spring-compression as the follower 40 rolls up one side of a cam 20d, and release the energy as heat when the follower 40 descends on the other side of the cam 20*d* as the resistance wheel 20 rotates in a work direction.

The cam surface 20*a* of the resistance wheel 20 may comprise a plurality of sawtooth cams 20*d*, each providing a progressive incline 20*f* on one side for the follower 40 to roll up and energise the spring 44, and a step decline 20*g* on the other for the follower 40 to jump down to release stored energy in the spring 44.

When a motor applies a turning force on the shaft 12 in the same direction as the feedback torque to adjust the setting of a component, the resistance wheel 20 can rotate with respect to the braking devices 38 to allow the motor to rotate the screw shaft. When the motor applies a turning force on the shaft 12 in the opposite direction to the feedback torque, in order to adjust the setting of a component, the resistance wheel 20 turns beneath the followers 40, wherein substantially all of the energy required to raise a given follower 40 over the step 20*g* (now experienced as a steep incline) of a cam 20*d* is recovered when that follower 40 rolls down the progressive incline 20*f* of the cam 20*d* towards land 20*e*. The ratchet wheel 22 abutting the resistance wheel 20 is free to rotate with the resistance wheel 22 in this direction, due to friction between the resistance wheel 20 and the ratchet 22. Consequently, there is only small energy loss caused by the no-back device 10 when the motor is trying to turn the actuator in the opposite direction to the feedback torque. When the no-back device 10 is placed between a motor and an actuator shaft, the motor only needs to provide a torque slightly greater than the feedback torque in order to actuate the motor.

In the example described above of a screw actuator being connected to a motor via a no-back device 10, feedback torque from the nut of the screw actuator is countered by the resistive angular force created by the braking assembly 19 through the resistance wheel 20 repeatedly energizing and releasing the energy from the springs 44 of the braking devices 38. Thus, the feeback torque is substantially not transmitted further along the mechanical path to the motor (the angular forces may not be exactly balanced). That is, the no-back device 10 acts to prevent feedback-induced rotation of the screw shaft and, consequently, prevent movement of the nut in an axial direction along the screw shaft.

Considering now the case where a nut on a screw shaft is under an axial load in an opposite direction (e.g., from the top of the shaft 12 in FIG. 2A into the no-back device 10, i.e., the shaft 12 is in compression), the shaft 12 is displaced (pushed) axially and urged towards the other resistance wheel 20 which in turn is urged towards the other ratchet wheel 22 and thrust bearing 24. As the feedback torque from the screw shaft will be in an opposite direction, the lower resistance wheel 20 and ratchet wheel 22 will be arranged to rotate in opposite directions to their counterparts on the other side of the flange 14. All of the details of the resistance wheels 20, braking devices 38, ratchet assemblies 21 may be the same as the previously explained counterparts, and therefore will not be repeated further.

When the motor is driven in the same direction as the feedback torque, then the motor is adding to the feedback torque and is therefore working against the resistance of the resistance wheel 20. Thus, the screw shaft may be turned by the motor in that direction.

When the motor is driven in the opposite direction from the feedback torque, the motor must overcome the feedback torque. In this case, the flange 14 is still pressing against the resistance wheel 20 and the motor is attempting to rotate the resistance wheel 20 in its backwards direction (non-work direction). As explained above, backwards rotation of the resistance wheel 20 is allowed by the followers 40 being sized sufficiently to roll over the cams 20*d* of the resistance wheel 20. The energy expended in compressing the spring 44 of the roller 40 is recovered by the roller pushing down on the sloping side of the cam 20*d* of the resistance wheel 20.

The housing 16 may provide a sealed environment for the ratchet and braking assemblies 21, 19. The housing 16 may contain grease or oil to lubricate the assemblies 21, 19.

As shown, the housing 16 may comprise a tubular or ring-shaped body section 16*c*, an inner cylindrical surface of which defines an internal cavity 16*f* with a diameter sized to receive the resistance and ratchet wheels 20, 22, and a pair of end plates 16*e* arranged on the tubular body section at opposite ends thereof. This may make for a simplified assembly of the no-back device 10. The end plates 16*e* may be welded or otherwise secured to the ring-shaped body member 16*c*. The braking devices 38 may be fabricated separately and slotted into position within the housing 16 within the radially extending holes 16*g*. The caps 39 may be adjusted to set the spring force on the resistance wheel 20. The pawls 26, similarly, may be slotted into the housing 16 within radially extending holes 16*g*.

FIG. 6 shows a perspective view of an exemplary no-back device 10 with the housing 16 omitted for ease of understanding. The flange 14 of the shaft 12 is shown seated between two resistance wheels 20, one on either side. Each resistance wheel 20 is sandwiched between the flange 14 and an associated ratchet wheel 22.

On the outermost side of each ratchet wheel 22, there is shown a thrust bearing 24. The thrust bearing 24 may comprise a thrust bearing wheel 24*a* with a plurality of thrust members 24*b* seated within recesses 24*c*. In the arrangement shown the thrust members 24*a* are radially aligned rollers 24*b* which are seated within rectangular, radially extending recesses 24*c*. Other shapes of thrust member 24*a* may also be used, for example, spherical or ovaloid members. While there are shown 12 thrust members 24*a*, as with the thrust members 20*b* of the resistance wheels 20, other numbers of thrust members 24*a* and respective spacings are envisaged.

As can be seen in FIG. 6, the resistance wheel 20 on one side of the flange 14 is oriented in the opposite direction to the resistance wheel 20 on the other side of the flange 14. Similarly, the ratchet wheel 20 on one side of the flange 14 is oriented in the opposite direction to the ratchet wheel 20 on the other side of the flange 14. Each resistance wheel 20 may have a row of braking devices 38 disposed about its circumference. Each of the braking devices 38 may be removed individually for maintenance.

The shaft 12 of the no-back device 10 may be coupled to a screw actuator and the resistive angular force may be set to substantially compensate for torque generated by axial loads placed on a nut of the screw actuator. The screw actuator may be a ball-screw actuator.

The apparatus may comprise a screw actuator or a ball-screw actuator. In other words it may be integral with the no-back device 10.

The actuator may comprise a left-handed screw thread and axial load on a nut of the actuator, from external forces in a direction towards the no-back device 10, may create clockwise torque on the shaft 12 (under load), which in turn urges the lower resistance wheel 20 in FIG. 6 in a clockwise direction past a plurality of braking devices 38 to generate resistive angular force to counter that torque.

Alternatively, the actuator may comprise a right-handed screw thread and axial load on a nut of the actuator, from external forces in a direction towards the no-back device 10, may create anti-clockwise torque on the shaft 12 (under load), which in turn urges the lower resistance wheel 20 in an anti-clockwise direction past a plurality of braking devices 38 to generate resistive angular force to counter that torque.

The no-back device 10 may be for an actuator of an aircraft.

The no-back device 10 may be for or part of trimmable horizontal stabilizer actuator (THSA).

The invention claimed is:

1. A no-back device comprising:
a flange arranged to receive torque via a shaft;
a ratchet assembly comprising a ratchet wheel arranged parallel to the flange; an
a braking assembly comprising a resistance wheel, which is sandwiched between the flange and the ratchet wheel, and a braking device, which acts on the resistance wheel to generate a resistive angular force reacting against torque exerted on the resistance wheel, the resistance wheel comprising a plurality of rollable thrust members to transfer axial load directly from the flange to the ratchet wheel;
wherein
the braking device comprises a follower arranged to roll, under bias from a spring in the braking device, on a cam surface extending around a circumferential perimeter of the resistance wheel, and whereby radial displacement of the follower energizes the spring to generate resistive angular force.

2. A no-back device as claimed in claim 1, wherein the generation of resistive angular force is in reaction to torque exerted on the resistance wheel from the flange when the flange is urged towards the resistance wheel under axial load and torque is received from the shaft.

3. A no-back device as claimed in claim 1, wherein the follower is coupled to an end of the spring, such that radially outward displacement of the follower causes corresponding compression in the spring, energising the spring.

4. A no-back device as claimed in claim 1, wherein the cam surface defines a plurality of cams to repeatedly energise and release the energy of the spring as the resistance wheel is rotated under the follower, whereby work is expended in the spring to generate resistive angular force on the resistance wheel, preferably wherein the cams of the cam surface have an asymmetrical duty cycle.

5. A no-back device as claimed in claim 4, wherein the cams have a convexly curved ramp-section where the incline is progressively reduced as the follower reaches an apex of the cam, and/or preferably wherein the cam surface comprises arcuate portions of substantially constant radius between the cams.

6. A no-back device as claimed in claim 1, wherein the cam surface of the resistance wheel comprises a plurality of sawtooth cams which are sized to allow the follower to roll over the cams in both directions without blocking rotation.

7. A no-back device as claimed in claim 1, wherein the no-back device comprises a plurality of braking devices arranged spaced about the circumferential perimeter of the resistance wheel, each having a spring-biased follower deployed to roll on different portions of the cam surface of the resistance wheel.

8. A no-back device as claimed in claim 1, wherein the no-back device comprises a second ratchet assembly and a second braking assembly positioned on an opposite side of the flange, for providing resistive angular force in reaction to torque in an opposite direction when under an axial load which urges the flange towards the second braking assembly and second ratchet assembly.

9. A no-back device as claimed in claim 1, wherein the device includes a housing and the housing comprises a row of holes arranged circumferentially around the housing, each hole corresponding to an associated braking device, wherein a cap is provided as part of a braking device to close off each hole and retain the braking device within the housing with the follower in biased contact with the cam surface of the resistance wheel.

10. A no-back device as claimed in claim 1, wherein the no-back device is for an actuator of a stabilizer, preferably for a trimmable horizontal stabilizer actuator (THSA).

11. A method of generating a resistive angular force in a no-back device, the method comprising:
receiving torque on a flange via a shaft;
engaging a ratchet assembly, the ratchet assembly comprising a ratchet wheel arranged parallel to the flange; and
engaging a braking assembly, the braking assembly comprising a resistance wheel, which is sandwiched between the flange and the ratchet wheel, and a braking device, which acts on the resistance wheel generating a resistive angular force reacting against torque exerted on the resistance wheel,
characterized by generating the resistive angular force by rolling a follower, under bias from a spring in the braking device, on a cam surface extending around a circumferential perimeter of the resistance wheel, the resistance wheel comprising a plurality of rollable thrust members to transfer axial load directly from the flange to the ratchet wheel, wherein radial displacement of the follower energises the spring to generate the resistive angular force.

12. A method of generating a resistive angular force as claimed in claim 11, including repeatedly energising and releasing energy in the spring to expend work as the follower rolls over the cam surface.

13. A method as claimed in claim 12, wherein the method includes engaging the ratchet assembly and the braking assembly by applying an axial load to the shaft, and/or preferably including generating resistive angular force on the resistance wheel when torque is received via the shaft in an angular direction that is blocked by the ratchet assembly, and/or preferably including releasing energy input into the spring as heat into the no-back device.

14. A trimmable horizontal stabilizer actuator including a no-back device comprising a no-back device as claimed in claim 1.

* * * * *